March 10, 1936.   P. T. SPRAGUE ET AL   2,033,491
PORTABLE INSTRUMENT
Filed April 1, 1933
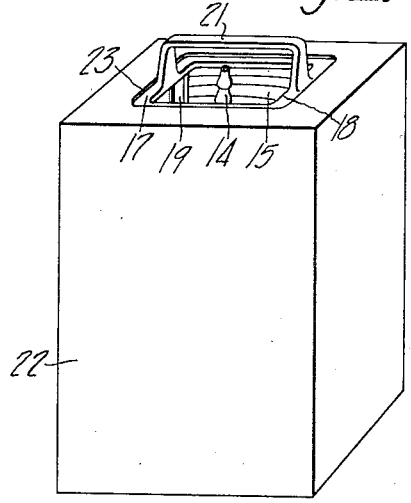
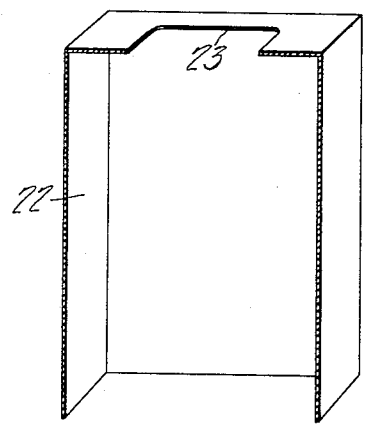
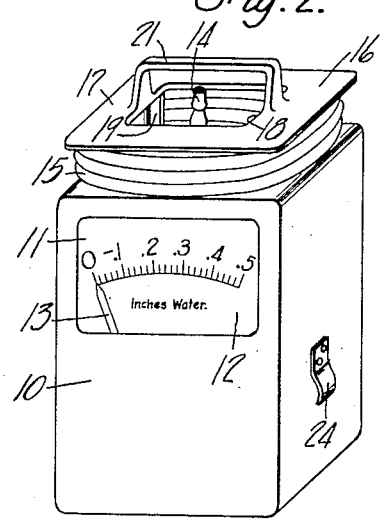
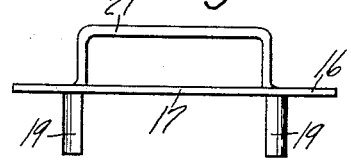
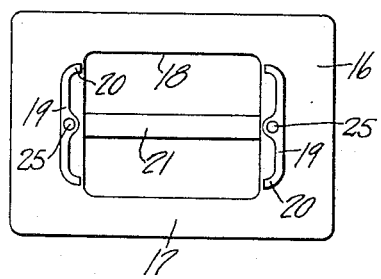
INVENTORS.
Philip T. Sprague.
Arnold Soller.
BY
ATTORNEY.

Patented Mar. 10, 1936

2,033,491

UNITED STATES PATENT OFFICE 2,033,491

PORTABLE INSTRUMENT

Philip T. Sprague and Arnold Soller, Michigan City, Ind., assignors to The Hays Corporation, Michigan City, Ind., a corporation Application April 1, 1933, Serial No. 663,892

4 Claims. (Cl. 242—96)

The invention relates to portable instruments, such as draft gauges, which require a flexible tube for connection with the flue or other apparatus whose characteristics are to be measured by the instrument.

The tubes of such portable instruments are difficult to handle when the instrument is being carried about from place to place. A casing is generally provided for the instrument, into which the instrument closely fits, and the tube is closely packed into the casing in any way possible. Due to the lack of adequate space and of suitable provision for the reception of the tube, the same is generally cramped into the available space and is soon broken or deteriorated, whereby it becomes unsatisfactory for its intended use. Furthermore, an expensive casing or container for the instrument is generally required to protect the instrument from breakage when not in use.

It is therefore an object of the invention to provide suitable means for the reception of the tubing of an instrument when the instrument is mounted in a casing.

A further object is to provide an instrument with means around which a flexible tube may be wound.

A further object is to provide means to be carried by an instrument to form a handle for the instrument and to receive a flexible tube.

A further object is to provide an instrument with a novel handle construction adapted to project from a casing for the instrument.

A further object is to provide an instrument with means for receiving a flexible tube, adapted to be received, with said instrument, within a casing for the instrument.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the instrument having the casing applied thereto.

Figure 2 is a perspective view of the instrument and the tube receiving means.

Figure 3 is a fragmentary perspective view of the instrument casing.

Figure 4 is a side elevation of the member forming the tube receiving means and instrument handle.

Figure 5 is a bottom plan view of the member forming the tube receiving means and instrument handle.

Referring to the drawing, which illustrates the preferred embodiment of the invention, the numeral 10 designates a portable instrument having a sight opening 11 through which the dial 12 and indicating pointer 13 of the instrument may be viewed. A nipple 14 to which a flexible tube 15 is connected when the instrument is in use projects from the upper end of the instrument.

An extension member 16, preferably integrally formed, is mounted on the upper side of the instrument, and comprises a plate 17 having an opening 18 formed centrally therein. A pair of flanges 19 extend perpendicularly of plate 17 adjacent opening 18 in inwardly spaced relation to the opposite edges of said plate, and are secured to the upper side of the instrument by suitable members (not shown) mounted in apertures 25 of said flanges and secured to the top plate of the instrument. The flanges 19 are preferably provided with inwardly curved ends 20, and terminate in inwardly spaced relation to the adjacent side edges of said plate 17. A handle 21 projects upwardly of plate 17.

A casing 22, preferably formed of sheet metal and open at one end thereof, is shaped to receive the instrument and extension member 16, said casing being provided with an opening 23 in the upper end thereof. The casing 22 is of a height substantially equal to the height of plate 17 above the base of the instrument and is slightly wider than the over-all width of the instrument. A spring member 24 is carried by one side of the instrument and engages said casing when said casing is operatively positioned.

When the instrument is not in use, the flexible tube 15 is wound around the flanges 19 of the extension member 16 of the instrument, in which position it is protected by the plate 17 and the top of the instrument, which latter extend outwardly of said flanges. With the type of nipple shown, the tube is preferably removed therefrom before being wound around flanges 19, though it will be understood that the tube may be so connected to the instrument that disconnection thereof from the instrument will not be necessary before winding it. The casing 22 is then slipped over the instrument to assume a position with its top resting upon plate 17. In this position the handle 21 projects through the opening 23 in the upper end of the casing to be accessible for use, and the nipple 14 also projects through said opening. The spring 24 is distorted by the casing and effects a frictional engagement with the casing by which the casing is effectively retained in operative relation to the instrument.

It will thus be seen that the instrument is provided with means about which the flexible tube may be wound to protect and hold the same while not in use; that the handle may be used when the instrument is in use or is encased; that a simple and inexpensive casing which effectively encases and protects the instrument and the tube is provided; and that simple means are provided for holding the casing in operative relation to the instrument.

The invention having been set forth, what is claimed as new and useful is:—

1. In combination, an instrument having a flexible tube, an extension carried by said instrument comprising a plate spaced from said instrument, a handle carried by said plate, and a pair of spaced flanges carried by said plate and secured to said instrument, said tube being windable about said flanges and beneath said plate.

2. An instrument having a nipple projecting from one end thereof, a plate spaced from said instrument and having an opening therein for the reception of said nipple, a pair of spaced flanges projecting from said plate and spaced inwardly from the adjacent outer edges of said plate, said flanges being secured to said instrument, a handle carried by said plate, and a flexible tube for connection with said nipple and windable around said flanges and beneath said plate.

3. An article of manufacture adapted for attachment to the face of an instrument from which a part adapted for connection with a flexible member extends, comprising a plate having an opening therein for the reception of said extending part, a pair of members projecting from one side of said plate on opposite sides of said opening for attachment to said face of said instrument, and a handle carried by said plate and spanning said opening.

4. An article of manufacture adapted for attachment to the face of an instrument having means for connection of a flexible tube therewith, comprising a plate spaced from said face, a pair of flanges about which said tube may be wound and adapted to be secured to said instrument, and a handle projecting from said plate at the side thereof opposite that from which said flanges extend, said handle serving to carry said article and instrument.

PHILIP T. SPRAGUE.
ARNOLD SOLLER.